United States Patent [19]
Lee

[11] Patent Number: 6,014,625
[45] Date of Patent: Jan. 11, 2000

[54] METHOD AND APPARATUS FOR PRODUCING LIP-MOVEMENT PARAMETERS IN A THREE-DIMENSIONAL-LIP-MODEL

[75] Inventor: Min-Sup Lee, Seoul, Rep. of Korea

[73] Assignee: Daewoo Electronics Co., Ltd, Rep. of Korea

[21] Appl. No.: 08/984,038

[22] Filed: Dec. 2, 1997

[30] Foreign Application Priority Data

Dec. 30, 1996 [KR] Rep. of Korea ............... 96-78100
Dec. 30, 1996 [KR] Rep. of Korea ............... 96-78101

[51] Int. Cl.[7] ............... G10L 9/18; G06T 17/00
[52] U.S. Cl. ............. 704/270; 704/201; 704/235
[58] Field of Search ................. 704/201, 235, 704/270

[56] References Cited

U.S. PATENT DOCUMENTS

| | | | |
|---|---|---|---|
| 4,260,229 | 4/1981 | Bloomstein | 352/50 |
| 5,313,522 | 5/1994 | Slager | 704/276 |
| 5,500,673 | 3/1996 | Zhou | 348/156 |
| 5,586,215 | 12/1996 | Stork et al. | 704/232 |
| 5,841,470 | 12/1998 | Welsh | 348/397 |
| 5,907,351 | 5/1999 | Chen et al. | 348/14 |

*Primary Examiner*—David R. Hudspeth
*Assistant Examiner*—Tālivaldis Ivars Šmits
*Attorney, Agent, or Firm*—Anderson Kill & Olick

[57] ABSTRACT

In a three-dimensional model-based coding system, a shape of mouth, especially, a shape of lip, among a shape of face, has an important visual information. As each person has the different shape of lip, however, it is desirable to transform the shape of lip based on an individual person. First, a characteristic three-dimensional lip model based on the individual person is generated by matching a three-dimensional lip model to a basic lip of the individual person. Subsequently, the characteristic three-dimensional lip model is converted into a two-dimensional lip model and rotated according an angle of a actual lip image. In case that the person is talking, the two-dimensional lip model is reconstructed based on a recognized syllable. Finally, a difference between the two-dimensional lip model and the actual lip image is calculated. As not a whole real lip image but the difference between the actual image and the two-dimensional lip model similar to the actual lip image is transmitted, the amount of transmission data can be reduced.

20 Claims, 4 Drawing Sheets

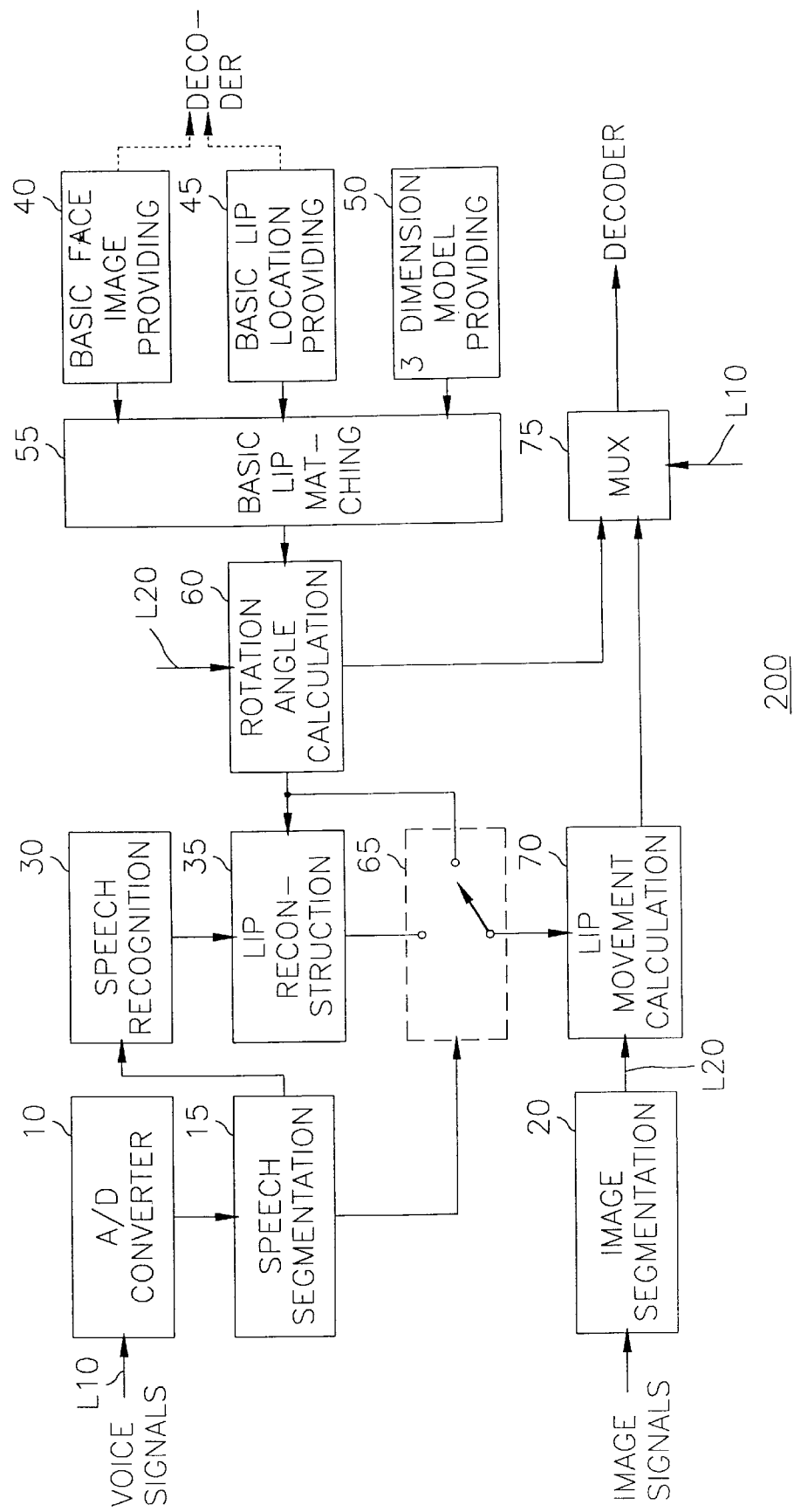

| [a] | ⌒ | ⌐ | [o] | ○ | ⌐ |
|---|---|---|---|---|---|
| [ ] | ⌒ | ⌐ | [u] | ○ | ⌐ |
| [i] | — | ⌐ | [ ] | ⌒ | ⌐ |
| CLOSED SYLLABLE | — | ⌐ | [e] | ⌒ | ⌐ |

# METHOD AND APPARATUS FOR PRODUCING LIP-MOVEMENT PARAMETERS IN A THREE-DIMENSIONAL-LIP-MODEL

FIELD OF THE INVENTION

The present invention relates to a method and apparatus for encoding a facial expression; and, more particularly, to a method and apparatus capable of producing a lip movement parameter in a 3 dimension model-based coding system.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially for such low bit-rate video signal encoders as video-telephone and teleconference systems transmitting a shape of human therethrough.

In a video coding system, images that are transmitted generally consist of pixels which vary continuously. In a 3 dimension model-based coding system, however, a particular movement parameter is extracted from the images and the same is transmitted to a receiving end. At the receiving end, in order to reconstruct the images, for example, facial images, the transmitted movement parameter is combined with data such as a shape of basic face of a person which is transmitted to the receiving end in advance and a general 3 dimension model for head.

In the video-telephone and teleconference systems, where the video images are primarily comprised of head-and-shoulder shots, i.e., an upper body of a person. Furthermore, a most likely object of interest to a viewer will be the face of the person and the viewer will focus his/her attention on moving parts, i.e., the person's mouth area including his/her lip, jaw, head and the like that are moving, especially when the person is talking in a video scene, as opposed to the background scenery or other details. Therefore, if only general information on the shape of the face is transmitted, the amount of digital data can be substantially reduced.

In the 3 dimension model-based coding system, the shape of the mouth, especially, that of the lip, has an important visual information in the face. The message and the feeling of the person can be well conveyed by the shape of the lip.

Referring to FIG. 1, there is shown a schematic block diagram of a conventional apparatus 100 for encoding digital images.

A lip image extracting block 10 extracts signals of pixels corresponding to a predetermined feature part, e.g., a mouth portion, from digital input signals of, e.g., a facial image, and provides the feature signals to a position information detecting block 15 and a shape information detecting block 20.

The position information detecting block 15 searches actual positions of individual elements, e.g., upper and lower lips, constituting the feature part and provides the same to a position information expressing block 25.

The position information expressing block 25 transforms the actual positions into absolute coordinates.

The shape information detecting block 20 analyzes the shape of the elements of the feature part and detects suitable feature points which are end points and center points of the elements and provides the same to a shape information expressing block 30.

The shape information expressing block 30 detects coordinates of the feature points and calculates output parameters thereof, e.g., a length between two end points which represents, e.g., a size of the mouth and relative values representing the shape thereof, e.g., the image of the mouth and the like.

As each person has a different shape of the lip, however, the above apparatus does not properly operate when a new image is inputted. Therefore, it is desired to transform a 3 dimension lip model to better approximate a actual lip image of the each person.

SUMMARY OF THE INVENTION

It is, therefore, an object of the present invention to provide a method and apparatus capable of producing lip movement parameters of an individual person in a 3 dimension model-based coding system with a reduced transmission data.

In accordance with one aspect of the present invention, there is provided a method for producing a lip movement parameter by using voice signals and image signals in a 3 dimension model-based coding system, wherein the lip movement parameter is a distance between a actual lip image and a transformed 2 dimension lip model, the actual lip image being an image of a lip of a person displayed which varies continuously, the method comprising the steps of:

(a) providing a characteristic 3 dimension lip model for the person by using a basic facial image of the person and a location of the basic lip of the person and a general 3 dimension lip model, wherein the basic facial image is an expressionless and mute front facial image of the person;

(b) recognizing syllables from the voice signals of the person, and providing a first selection signal at a moment when an amount of an energy of the syllable along a time axis and a frequency axis becomes greater than a predetermined threshold, and provides a second selection signal at a moment when the amount of the energy of the syllable begins to fall below the predetermined threshold;

(c) extracting the actual lip image of the person from the image signals;

(d) presenting a 2 dimension lip model transformed based on a rotation angle and the syllable; and (e) transmitting lip movement parameters, the voice signals and the rotation angle to a decoder.

In accordance with another aspect of the present invention, there is provided an apparatus for producing a lip movement parameter by using voice signals and image signals in a 3 dimension model-based coding system, wherein the lip movement parameter is a distance between a actual lip image and a transformed 2 dimension lip model, the actual lip image being an image of a lip of a person displayed which varies continuously, comprising:

means for recognizing syllables from the voice signals of the person to provide a recognized syllable and a selection signal;

means for extracting the actual lip image of the person from the image signals;

means for providing a characteristic 3 dimension lip model for the person by using a basic facial image of the person and a location of the basic lip of the person and a general 3 dimension lip model, wherein the basic facial image is an expressionless and mute front facial image of the person;

means for transforming the characteristic 3 dimension lip model into a characteristic 2 dimension lip model, and calculating a rotation angle by comparing the characteristic 2 dimension lip model with the actual lip image to provide a rotated 2 dimension lip model and the rotation angle;

means for reconstructing the rotated 2 dimension lip model based on the syllable to provide a reconstructed 2 dimension lip model; and means for transmitting lip movement parameters, the voice signals and the rotation angle to a decoder.

BRIEF DESCRIPTION OF THE DRAWINGS

The above and other objects and features of the present invention will become apparent from the following description of preferred embodiments given in conjunction with the accompanying drawings, in which:

FIG. 2 presents a block diagram of an apparatus 200 for producing a lip movement parameter of an individual person in accordance with the present invention;

DETAILED DESCRIPTION OF THE PREFERRED EMBODIMENTS

Figure 1:
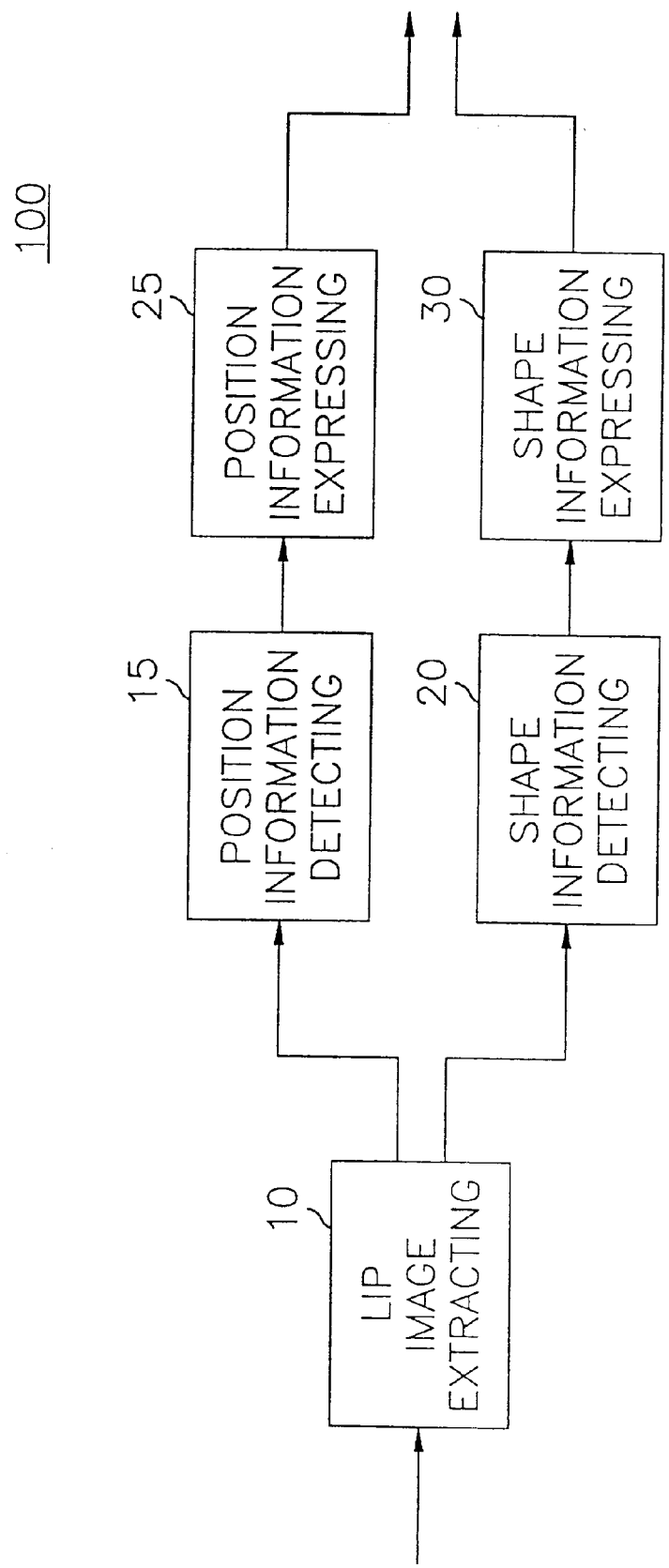
FIG. 1 shows a block diagram of a conventional apparatus 100 for encoding digital images.

An operation of the present invention will be explained on the assumption that an input image is a human face and a predetermined feature part of a facial image to be encoded is a mouth portion.

Referring to FIG. 2, there is shown a block diagram of an apparatus 200 for producing a lip movement parameter in accordance with the present invention, wherein the lip movement parameter represents a difference between a actual lip image and a transformed 2 dimension lip model, the actual lip image being an image of a lip of a person displayed on a screen which vary continuously.

First of all, once communication channel is connected, from a basic face image providing block 40 and a basic lip location providing block 45, a basic facial image of the person and a basic lip location of the person are transmitted only once to a decoder of a receiving end for reconstructing a whole facial image of the person thereat, wherein the basic facial image is an expressionless and mute front facial image of the person.

Subsequently, voice signals is inputted to an A/D converter 10 and a multiplexor(MUX) 75 via a line L10 from a microphone(not shown) and image signals is provided to an image segmentation block 20 from a camera(not shown).

The A/D converter 10 transforms the voice signals into digitalized voice signals and provides the same to a speech segmentation block 15. In the meantime, the image segmentation block 20 extracts an edge of a actual lip image, which is an example of the predetermined feature part in the preferred embodiments of the present invention, through the use of a conventional segmentation method using a light distribution of the image and provides a contour representing a boundary of the lip and inner information of the contour to a rotation angle calculation block 60 and a lip movement calculation block 70 via a line L20.

Subsequently, the speech segmentation block 15 extracts syllables from the digitalized voice signals by using a conventional speech segmentation method as disclosed in U.S. Pat. No. 5,675,705 issued on Oct. 7, 1997, entitled "SPECTROGRAM-FEATURE-BASED SPEECH SYLLABLE AND WORD RECOGNITION USING SYLLABLE LANGUAGE DICTIONARY" and provides the extracted syllables to a speech recognition block 30. Further, the speech segmentation block 15 provides a first selection signal to a switch 65 when an amount of an energy of the syllable along a time axis and a frequency axis becomes greater than a predetermined threshold, signifying that the person is talking, and provides a second selection signal to the switch 65 when the amount of the energy begins to fall below the predetermined threshold, indicating that the person expresses an emotion(see U.S. Pat. No. 5,675,705 for more details).

The voice recognition block 30 recognizes the syllables fed from the voice identification block 15 by using a conventional voice recognition method as disclosed in U.S. Pat. No. 5,675,705, and provides the same to a lip reconstruction block 35.

Meanwhile, the basic face image providing block 40 and the basic lip location providing block 45 provide the basic facial image and the lip location information of the basic face, respectively, to a basic lip matching block 55. And a 3-dimension model providing block 50 that has a general 3-dimension model for head provides a lip region of the 3 dimension model to the basic lip matching block 55, wherein the 3-dimension model for lip 200 has been stored as a 3-dimension computer graphic of wire frame in the shape of net connecting a multiplicity of polygons shown in FIG. 3a.

The basic lip matching block 55 matches the lip of the 3 dimension model to the basic lip of the person by using a method explained below and provides the matched result to the rotation angle calculation block 60 as a characteristic 3 dimension lip model corresponding to an individual person.

Figure 3A:
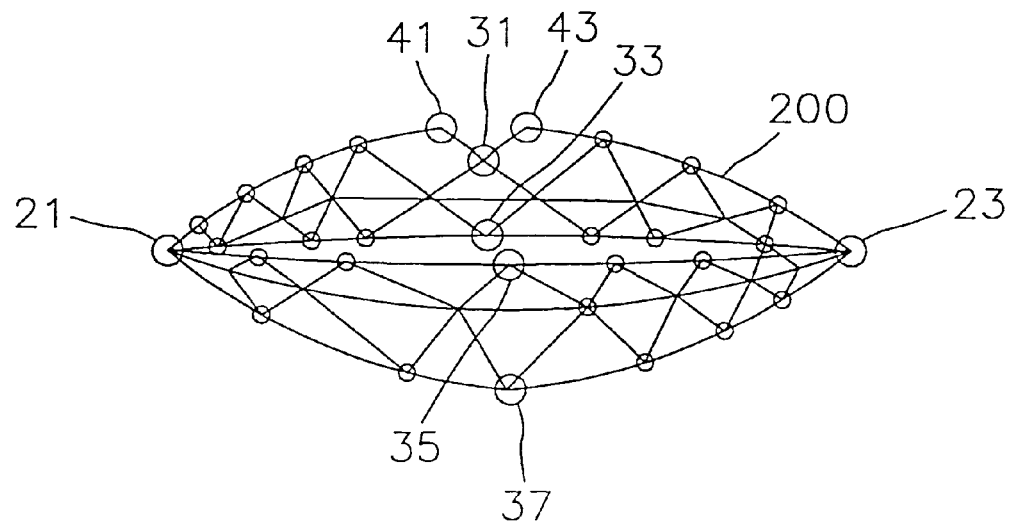
FIGS. 3A and 3B depict a process for matching a lip image of a 3 dimension model 200 to a basic lip image 300 of the person in accordance with the present invention.
Figure 3B:
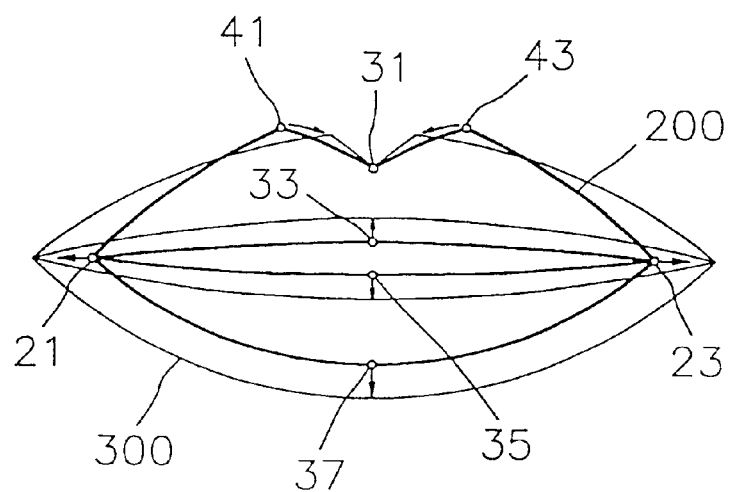

FIGS. 3a and 3b depict a process for matching the 3 dimension lip model 200 to the basic lip 300 of the individual person. First, as shown in FIG. 3a, most conspicuous featuring points among points located on a contour of the 3 dimension lip model 200, e.g., left and right ending points of the 3 dimension lip model (21, 23), sharp-edged points in a upper region of the 3 dimension lip model (41, 43) and points which cross a central region of the 3 dimension lip model lengthwise (31, 33, 35, 37), are selected as feature points having a high priority. Subsequently, as shown in FIG. 3b, a most similar region between the 3 dimension lip model 200 and the basic lip 300 is searched within regular search range with respect to the respective feature points to move the feature points onto the contour of the basic lip 300. And, the contour of the 3 dimension lip model is reconstructed on the basis of the moved feature points. With respect to the remaining points, in case that a distance between a point on the contour of the reconstructed 3 dimension lip model and its similar region of the basic lip is greater than a predetermined threshold, the above method is repeatedly carried out.

The rotation angle calculation block 60 transforms the characteristic 3 dimension lip model fed from the basic lip matching block 55 into a characteristic 2 dimension lip model and calculates a rotation angle by comparing the actual lip image fed from the image segmentation block 20 with the characteristic 2 dimension lip model through the use of a conventional method, e.g,. an affine transform method to provide the rotation angle to the MUX 75, and to provide a rotated 2 dimension lip model rotated by the rotation angle to the lip reconstruction block 35 and the switch 65.

The lip reconstruction block 35 magnifies or reduces the shape of the rotated 2 dimension lip model fed from the rotation angle calculation block 60 with a regular ratio based on the syllable recognized at the voice recognition block 30 to provide the result to the switch 65 as a reconstructed 2 dimension lip model.

Figures 4, 5:
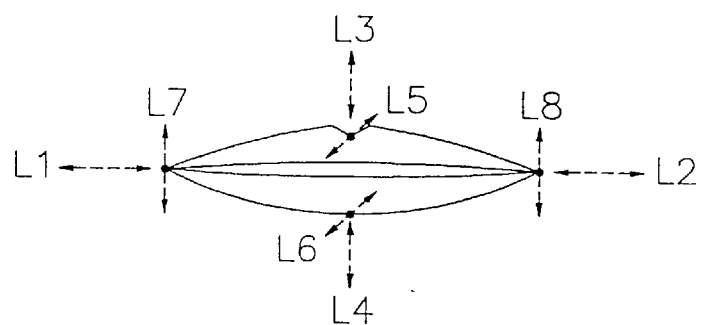
FIG. 4 provides a multiplicity of lip patterns according to syllables in accordance with the present invention.
FIG. 5 shows a plurality of lip movement parameters in accordance with the present invention.

FIG. 4 shows a multiplicity of representative patterns of lip according to basic voice syllables recognized at the voice recognition block 30, wherein the basic voice syllables originate from seven passible regions according to a human vocal system. For example, if "a" sound is recognized at the voice recognition block 30, the rotated 2 dimension lip model would be extended toward up and down directions rather than left and right directions at the lip reconstruction block 35. As the 2 dimension lip model approximates the actual lip image by using the recognized syllable when the person is talking, the amount of data in the encoding process can be substantially reduced. In FIG. 4, a closed syllable means that the syllable is ending by a consonant.

The switch 65 selects either the reconstructed 2 dimension lip model fed from the lip reconstruction block 35 in response to the first selection signal fed from the voice identification block 15 or the rotated 2 dimension lip model fed from the rotation angle calculation block 60 in response to the second selection signal fed from the voice identification block 15 and provides the selected one to the lip movement calculation block 70.

The lip movement calculation block 70 calculates movement quantities between the actual lip image and the reconstructed 2 dimension lip model, that corresponds to the case when the person is talking or movement quantities between the actual lip image and the rotated 2 dimension lip model, which corresponds to the case when the person expresses an emotion, with respect to the following parameters shown in FIG. 5, i.e., left-right movement parameters of both ending points of the 2 dimension lip model (L1, L2), up-down movement parameters in most upper and lower points in a central region of the 2 dimension lip model (L3, L4), forward-backward movement parameters in the most upper and lower points in the central region of the 2 dimension lip model (L5, L6) and up-down movement parameters of the ending points of the 2 dimension lip model (L7, L8) to provide them to the MUX 75 as lip movement parameters. The lip movement parameters are selected within a predetermined computing range, e.g., from −1 to 1, wherein a medium value "0" means that the actual lip image corresponds to the 2 dimension lip model.

The MUX 75 multiplexes the lip movement parameters and the voice signals and the rotation angle to transmit them to the decoder of the receiving end.

The decoder of the receiving end combines its own 3 dimension model with the basic facial image of a counterpart transmitted thereto in the first stage and generates the 3 dimension model of the counterpart for the basic face. Subsequently, the 3 dimension model is transformed into a 2 dimension model. And, in a transmitting data stream, according to the rotation angle and voice signal, the 2 dimension model is rotated and reconstructed in a same manner as in the rotation angle calculation block 60 and the lip reconstruction block 35 in the apparatus 200. Finally, the lip movement parameters are added to the 2 dimension model to make the actual facial image of the counterpart.

While the present invention has been described with respect to the particular embodiments, it will be apparent to those skilled in the art that various changes and modifications may be made without departing from the spirit and scope of the invention as defined in the following claims.

What is claimed is:

1. A method for producing a lip movement parameter by using voice signals and image signals in a 3 dimension model-based coding system, wherein the lip movement parameter is a distance between a actual lip image and a transformed 2 dimension lip model, the actual lip image being an image of a lip of a person displayed which varies continuously, the method comprising the steps of:

(a) providing a characteristic 3 dimension lip model for the person by using a basic facial image of the person and a location of the basic lip of the person and a general 3 dimension lip model, wherein the basic facial image is an expressionless and mute front facial image of the person;

(b) recognizing syllables from the voice signals of the person, and providing a first selection signal at a moment when an amount of an energy of the syllable along a time axis and a frequency axis becomes greater than a predetermined threshold, and providing a second selection signal at a moment when the amount of the energy of the syllable begins to fall below the predetermined threshold;

(c) extracting the actual lip image of the person from the image signals;

(d) presenting a 2 dimension lip model transformed based on a rotation angle and the syllable; and (e) transmitting lip movement parameters, the voice signals and the rotation angle to a decoder.

2. The method according to claim 1, wherein the step (a) includes the steps of:

(a1) selecting feature points on a contour of the 3 dimension lip model and assigning a high priority to them;

(a2) moving the feature points onto a contour of the basic lip image by searching a most similar region between the 3 dimension lip model and the basic lip image within a regular search range;

(a3) reconstructing the contour of the 3 dimension lip model on the basis of the moved feature points; and (a4) repeating the steps (a2) and (a3) with respect to remaining points in case that a distance between a point of the reconstructed 3 dimension lip model and its most similar region of the basic lip image is greater than a predetermined threshold.

3. The method according to claim 2, wherein the feature points include left and right ending points of the 3 dimension lip model, sharp-edged points in a upper region of the 3 dimension lip model and points which cross a central region of the 3 dimension lip model lengthwise among points located on the contour of the 3 dimension lip model.

4. The method according to claim 3, wherein the step (c) is carried out by a segmentation method.

5. The method according to claim 4, wherein the step (d) includes steps of:

(d1) transforming the characteristic 3 dimension lip model into a characteristic 2 dimension lip model;

(d2) calculating the rotation angle by comparing the characteristic 2 dimension lip model with the actual lip image to provide a rotated 2 dimension lip model and the rotation angle; and (d3) reconstructing the rotated 2 dimension lip model based on the syllable to provide a reconstructed 2 dimension lip model.

6. The method according to claim 5, wherein the reconstructed 2 dimension lip model is reconstructed based on 7 basic voice syllables.

7. The method according to claim 6, wherein the rotation angle is calculated by using an affine transform method.

8. The method according to claim 7, wherein the step (e) includes steps of:

(e1) computing movement quantities within a predetermined computing range between the actual lip image and either one of the reconstructed 2 dimension lip model in response to the first selection signal provided from the step (b) and the rotated 2 dimension lip model in response to the second selection signal provided from the step (b) to generate the lip movement parameters; and (e2) multiplexing the lip movement parameters, the voice signals and the rotation angle.

9. The method according to claim 8, wherein the lip movement parameters include left-right movement parameters and up-down movement parameters of both left and right ending points of the 2 dimension lip model, and up-down movement parameters and forward-backward movement parameters of most upper and lower points in a central region of the 2 dimension lip model.

10. The method according to claim 9, wherein the predetermined computing range is between −1 and 1.

11. An apparatus for producing a lip movement parameter by using voice signals and image signals in a 3 dimension model-based coding system, wherein the lip movement parameter is a distance between a actual lip image and a transformed 2 dimension lip model, the actual lip image being an image of a lip of a person displayed which varies continuously, comprising:

means for recognizing syllables from the voice signals of the person to provide a recognized syllable and a selection signal;

means for extracting the actual lip image of the person from the image signals;

means for providing a characteristic 3 dimension lip model for the person by using a basic facial image of the person and a location of the basic lip of the person and a general 3 dimension lip model, wherein the basic facial image is an expressionless and mute front facial image of the person;

means for transforming the characteristic 3 dimension lip model into a characteristic 2 dimension lip model, and calculating a rotation angle by comparing the characteristic 2 dimension lip model with the actual lip image to provide a rotated 2 dimension lip model and the rotation angle;

means for reconstructing the rotated 2 dimension lip model based on the syllable to provide a reconstructed 2 dimension lip model; and means for transmitting lip movement parameters, the voice signals and the rotation angle to a decoder.

12. The apparatus according to claim 11, wherein the recognizing means includes:

means for converting the voice signals into digitalized voice signals;

means for identifying syllables from the digitalized voice signals; and means for presenting a first selection signal at a moment when an amount of an energy of the recognized syllable along a time axis and a frequency axis becomes greater than a predetermined threshold, and presenting a second selection signal at a moment when the amount of the energy of the recognized syllable begins to fall below the predetermined threshold.

13. The apparatus according to claim 12, wherein the extracting means includes a segmentation technique.

14. The apparatus according to claim 13, wherein the providing means includes:

means for selecting feature points on a contour of the 3 dimension lip model and assigning a high priority to them;

means for moving the feature points onto a contour of the basic lip image by searching a most similar region between the 3 dimension lip model and the basic lip image within a regular search range;

means for reconstructing the contour of the 3 dimension lip model on the basis of the moved feature points; and means for repeating the moving and reconstructing means with respect to remaining points in case that a distance between a point of the reconstructed 3 dimension lip model and its most similar region of the basic lip image is greater than a predetermined threshold.

15. The apparatus according to claim 14, wherein the feature points include left and right ending points of the 3 dimension lip model, sharp-edged points in a upper region of the 3 dimension lip model and points which cross a central region of the 3 dimension lip model lengthwise among points located on the contour of the 3 dimension lip model.

16. The apparatus according to claim 15, wherein the reconstructed 2 dimension lip model is reconstructed based on 7 basic voice syllables.

17. The apparatus according to claim 16, wherein the rotation angle is calculated by using an affine transform technique.

18. The apparatus according to claim 17, wherein the transmitting means includes:

means for computing movement quantities within a predetermined computing range between the actual lip image and either one of the reconstructed 2 dimension lip model in response to the first selection signal provided from the presenting means and the rotated 2 dimension lip model in response to the second selection signal provided from the presenting means to generate the lip movement parameters; and means for multiplexing the lip movement parameters, the voice signals and the rotation angle.

19. The apparatus according to claim 18, wherein the lip movement parameters include left-right movement parameters and up-down movement parameters of both left and right ending points of the 2 dimension lip model, and up-down movement parameters and forward-backward movement parameters of most upper and lower points in a central region of the 2 dimension lip model.

20. The apparatus according to claim 19, wherein the predetermined computing range is from −1 to 1.

* * * * *